United States Patent [19]

Iwamoto

[11] 4,290,895

[45] Sep. 22, 1981

[54] METHOD FOR ELIMINATING AMMONIA NITROGEN FROM SEWAGE

[76] Inventor: Tsuneo Iwamoto, 9-19, Karikuchidai 5-chome, Tarumi-ku, Kobe-City, Hyogo, Japan

[21] Appl. No.: 118,947

[22] Filed: Feb. 6, 1980

[30] Foreign Application Priority Data

Mar. 6, 1979 [JP] Japan .................................. 54/26327

[51] Int. Cl.³ ............................................... C02F 1/28
[52] U.S. Cl. .................................... 210/669; 210/903
[58] Field of Search ................... 55/70; 210/24, 38 R, 210/DIG. 28, 660, 669, 903

[56] References Cited

U.S. PATENT DOCUMENTS

| | | | |
|---|---|---|---|
| 3,475,330 | 10/1969 | Gilles | 210/38 R |
| 3,723,308 | 3/1973 | Breck | 210/38 R |
| 3,842,000 | 10/1974 | Dawson | 210/38 R |
| 3,948,769 | 4/1976 | Dobbs | 210/38 R |
| 4,098,690 | 7/1978 | Semmens | 210/38 R |
| 4,130,484 | 12/1978 | Marwil et al. | 55/70 |

FOREIGN PATENT DOCUMENTS 574390 9/1977 U.S.S.R. .................................. 55/70

OTHER PUBLICATIONS

"A Critical Review of Current Municipal Wastewater Treatment Technology," Pacific Northwest Labs Publication, (Jul.) 1973, pp. 1-9, 41-50 and 63-67.
Plank, C. J., "The Adsorption of Ions from Buffer Solutions by Silica, Alumina and Silica-Alumina Gels," J. Phys. Chem., vol. 57, (Mar.) 1953, pp. 284-290.

Primary Examiner—Ivars C. Cintins
Attorney, Agent, or Firm—Griffin, Branigan & Butler

[57] ABSTRACT

Sewage contains much nitrogen as ammonium ions. The inventor has discovered that silica gel adsorbs ammonia very well under a high pH range. Silica gel is conditioned by an alkali solution and is packed in an adsorption vessel. The pH of sewage is also adjusted by adding alkali solution. The alkali-conditioned sewage is passed through the adsorption vessel. The ammonia molecules in the sewage are then adsorbed by the silica gel.

6 Claims, 5 Drawing Figures

$q = 2.85 \times 10^{-5} C^{2/3}$

METHOD FOR ELIMINATING AMMONIA NITROGEN FROM SEWAGE

BACKGROUND OF THE INVENTION

This invention relates to a method for eliminationg ammonia nitrogen from sewage by contacting sewage with silica gels.

There are large amounts of BOD (Biochemical Oxygen Demand), COD (Chemical Oxygen Demand), ABS (Alkyl Benzyl Sulfonates), organic nitrogen and ammonia nitrogen in the waste drained from houses or factories.

The treatments of sewage can be divided into the primary, the secondary and the tertiary treatments.

The primary treatment is sedimentation. Only a fraction of organic and inorganic suspended matter in sewage is removed by sedimentation.

The secondary treatment is an activated sludge process. Most of BOD and COD in sewage is removed by activated sludge. At the same time organic nitrogen decreases slightly.

In many cases one of the tertiary treatments is an activated carbon process, by which the values of COD, ABS and organic nitrogen decrease further.

The water obtained by the tertiary treatment contains less than 1 ppm of BOD, 1~25 ppm of COD, 1~6 mg/l of total organic carbon, 0.01~0.5 mg/l of ABS, 0.1~1 mg/l of $PO_4$, and 1~2 mg/l of organic nitrogen. It is very clean.

However there is a contaminant which is not eliminated by the abovementioned treatments. It is ammonia nitrogen. It is very difficult to eliminate ammonia nitrogen from sewage because it is quite soluble in water and very stable as a nitrogen compound.

Ammonia nitrogen overnourishes rivers, lakes and seas, which causes red tide phenomena and facilitates abnormal generation of seaweed. Fish and shells suffer vast damages from the excess ammonia nitrogen.

Furthermore the water containing ammonia nitrogen is not good as a source of service water. It causes corrosion of metals.

This invention will solve the difficulties by eliminating ammonia nitrogen from sewage and making clean water. This invention gives a new method for eliminating ammonia nitrogen which is best for the tertiary treatment of sewage.

Throughout this specification "ammonia nitrogen" is defined as the nitrogen atom N in the ammonia molecule $NH_3$. Nitrogen is included in various forms in materials, for example as protein in animals or plants, nitrites, nitrates, nitric acid, ammonia or atmospheric nitrogen. But the nitrogen contained in sewage mostly exists as ammonium ions. Therefore the elimination of ammonia nitrogen is not easy. The applied water of the invention is the water obtained after secondary treatment.

The water obtained after the secondary treatment contains less than 1 ppm of BOD, 20~60 ppm of COD, 8~18 mg/l of organic carbons, 0.4~2.9 mg/l of ABS, 2~4 mg/l of organic nitrogen and no suspended matter. However the concentration of ammonia nitrogen is unaltered and comes to 20~30 ppm.

Some methods for eliminating ammonia nitrogen have already been found and used.

For example, (1) Ammonia Stripping (2) Ion Exchange (3) Biological Nitrification-Denitrification (4) Breakpoint Chlorination The ammonia stripping process includes the high pH conditioning nearly to 11 and the stripping with large volumes of air 3000 times as much as the volume of the sewage. In the process ammonia is removed by the air and discharged as ammonia gas to the atmosphere.

A disadvantage of the process is that it requires a large amount of air. Thus the process needs large cooling towers and causes high operating costs. Moreover it is necessary to treat a large amount of ammonia gas. But the treatment of ammonia gas is very difficult because it has been diluted by a large amount of air. Sometimes it may cause secondary air pollution.

An ion exchange process selectively eliminates ammonium ions from sewage by passing the ions directly through a zeolite bed. This process has a difficulty with the regeneration of zeolite. Zeolite is regenerated with a solution of caustic soda or caustic potash added with Nacl at near pH 12. The spent regenerant containing high concentration of ammonium ion ($NH_4^+$) is air-stripped to eliminate ammonia.

In the case of thermal regeneration of zeolite, Ammonia is discharged to the atmosphere as a gas by heating the zeolite.

However both methods of the regeneration of zeolite are incomplete.

The alkaline-Nacl regeneration cannot entirely eliminate ammonium ions from the spent regenerant. In the case of the thermal regeneration hydrogen ions $H^+$ remain in the regenerated zeolite which decreases the efficiency of ammonia elimination. An additional disadvantage is that the zeolite is damaged by heating.

Biological Nitrification-Denitrification is a process to oxidize ammonia nitrogen to nitrate nitrogen by nitrification bacteria under aerobic conditions and to reduce nitrate-nitrogen to nitrogen gas $N_2$ under anaerobic conditions. The $N_2$ is then discharged to the atmosphere.

This method is ideal. It causes no secondary pollution, because ammonia is converted to nitrogen gas.

However as this method utilizes bacteria, it needs big installations where it is difficult to maintain optimum operating conditions Especially in winter, Ammonia removal efficiency decreases significantly because of low temperature. Furthermore, when nitrate nitrogen is reduced to nitrogen gas, nourishment for bacteria, for example, methanol must be added. Thus the operating cost is high.

In breakpoint chlorination chlorine gas is blown into sewage. Chlorine gas becomes a hypochlorous acid ion in the water; and, the ammonium ion is finally oxidized to nitrogen gas via chloramines.

The advantage of the required method is that the equipment is comparatively simple.

But the method needs a large amount of chloride—about eight times as much as ammonia nitrogen in weight. Furthermore chlorine is fatally poisonous and chloramines (intermediate materials; $NH_2Cl$, $NHCl_2$, $NCl_3$) are also poisonous. These poisonous materials must be completely eliminated.

Activated carbon is used in water treatment wherein ammonia in gas-phase is sightly adsorbed by activated carbon. However as before-mentioned, the ammonia adsorption ability of activated carbon is low. This method cannot bring about a satisfactory result.

Totally differing from these methods, this invention uses silica gel to adsorb ammonia nitrogen.

The main component of silica gel is written as $SiO_2$. Silica gel is a glassy porous material which has neither solubility in water, corrodability nor deliquescence.

Silica gel has many small holes which are formed by networks of colloidal particles of silica which have enormous effective surface areas. In A-type silica gel (standard type), the surface area is $700 \sim 800$ m$^2$/g; the diameter of the small holes is $22 \sim 26$ Å; and, the volume of the small holes is 0.4 cc/g. In B-type silica gel (low concentration type) the surface area is $300 \sim 500$ m$^2$/g; the diameter of the small holes is $70 \sim 150$ Å; and, the volume of the small holes is 0.8 cc/g.

On account of the enormous number of small holes, silica gel can adsorb water very well by capillary action. Indeed silica gel is a most frequently used hygroscopic material. Silica gel has various uses as an adsorbent of moisture—a dehumidifier or dryer. It is indispensable for preservation of foods; dehumidifying of storehouses; or, the prevention of mold, putrefacation or corrosion of goods in transportation. Silica gel is used for dehydrating and refining hydrogen gas, oxygen gas, chlorine gas, carbonic acid gas or other industrial gases.

Indeed silica gel is a most desirable dryer, as it is tasteless, scentless, harmless to human beings and chemically stable. Moreover it is desirable in that it handles very easily and can be easily regenerated by heating.

Both A-type silica gel and B-type silica gel adsorb moisture very well, but their constitution differs a little. Because A type silica gel has greater surface area, it has a great ability to adsorb moisture by the affinity of the hydroxide groups on the surface. It is suitable at low humidity.

B-type silica gel has a larger volume of small holes. Thus it is suitable for dehumidifying at high humidity.

It is well known that silica gel adsorbs moisture by capillary action, but nobody has recognized that silica gel can adsorb ammonia. The inventor on the other hand has discovered that silica gel selectively adsorbs ammonia and, that discovery has led to the invention about to be further described.

SUMMARY OF THE INVENTION

This invention provides a method for eliminating ammonia by adding alkali to sewage and contacting the sewage with silica gel prepared by alkali conditioning. This method is divided into three steps as follows:

(i) adding alkali to sewage, (ii) alkali-conditioning of silica gel; and, (iii) contacting the alkali-treated sewage with the conditioned silica gel.

Each of those steps will now be separately discussed.

(i) Adding alkali to sewage:

In neutral (nearly pH 7) sewage ammonia nitrogen exists mostly as the ammonium ion which has a strong affinity with water. It is very difficult to eliminate ammonia nitrogen from sewage because it is chemically stable in that state. Therefore some alkali material (caustic soda, caustic potash or sodium carbonate) is added to the sewage to raise its pH to more than 10. pH=11 is the best condition bothe from the viewpoints of cost and chemical efficiency. In this sewage of high pH, ammonia nitrogen exists mostly as soluble ammonia and ammonium ions are few. The reason for this is shown by the equilibrium equation:

$$NH_4^+ + OH^- \rightleftharpoons NH_3 + H_2O,$$

where the equilibrium constant (at 18° C.) is as follows $$[NH_4^+][OH^-]/[NH_3] = 1.75 \times 10^{-3}$$

For example if pH=11, the ratio of ammonium ions to ammonia is in the order of $10^{-3}$.

The reason for the addition of alkali is to change the ammonium ions in the sewage to soluble ammonia which can easily be separated from the water by this method. Conditioning to raise the pH by adding alkali to facilitate the elimination of ammonia, however, is a well known technique. For example the aforementioned ammonia stripping process also requires this preliminary conditioning.

(ii) Alkali-conditioning of silica gel:

Silica gel is an acidic material. If original silica gel, without preparatory conditioning, is contacted with sewage, it consumes a large amount of alkali and lowers the pH. Low pH is undesirable, however because it makes the equilibrium with ammonia and ammonium ion reverse so that it tends toward ammonium ions. Therefore the silica gel must be conditioned by alkali.

The conditioning is accomplished by dipping the silica gel into a solution of caustic soda, caustic potash, calcium hydroxide, sodium carbonate or other alkaline materials. After being taken out from alkaline solution, the silica gel is dried and is thusly conditioned by alkali.

(iii) Contacting sewage with silica gel:

A continuous operation and a batch operation are both available.

In the case of the continuous operation, sewage is continuously passed through an adsorption vessel which contains a silica gel bed. The sewage contacts the silica gel directly and ammonia is adsorbed by the porous network of the silica gel.

In the case of a batch operation, sewage is poured into an adsorption vessel which contains a silica gel bed, and, after a definite time, of at least four hours, the sewage is drained from the vessel.

In both cases soluble ammonia is adsorbed by the silica gel.

In a practical application the regeneration of the silica gel is another important problem. Hence, the process of the regeneration of the silica gel will now be discussed.

(iv) Regeneration of silica gel:

The silica gel which is saturated with ammonia must be regenerated. Hence, after draining sewage from the adsorption vessel, air is blown up or down through the silica gel bed by a fan. Thus ammonia which has been adsorbed in the silica gel is transferred to the air. The temperature of the air is from room temperature to nearly 50° C.

As the air is passing through the silica gel bed, the ammonia is desorbed and the silica gel is air-dried. The completion of drying of the the silica gel moisture can be regarded as the end point of regeneration operation.

An example of regeneration is as follows.

Absorption column: 300 ml

Air pressure: 0.4 kg/cm$^2$ flow rate: 2 m$^3$/hr temperature: 20° C.

The air is blown through the adsorption column. In an hour the silica gel becomes dry, and the regeneration operation finished.

The exhaust air containing ammonia is introduced into another adsorption vessel which contains dilute sulfuric acid. The ammonia then combines chemically with the sulfric acid to form ammonium sulfate.

DETAILED DESCRIPTION

EMBODIMENT (1) (dynamic example)

a. Silica gel:
globular form
diameter about 3 mm
sample 270 g (300 cc)
after alkali conditioning b. Test sewage Test sewage was prepared from city water by adding ammonium chloride (NH4Cl) until the concentration of ammonia nitrogen came up nearly to 20 ppm, which corresponds to the concentration of the effluent after the secondary treatment. The exact concentration of this test sewage was 19.4 ppm.

Then pH of the sewage was adjusted to 10.8 with caustic soda. The temperature of the sewage was 23° C.

c. Equipment

The adsorption column was a cylinder made of plastics. The inner diameter was 4 cm and the length was 30 cm. When the aforementioned silica gel was packed in the cylinder, the height of the silica gel bed was 24 cm.

d. Flow rate of sewage

The linear velocity of sewage in the cylinder was from 1.4 to 1.8 m/hr.

Figure 1:
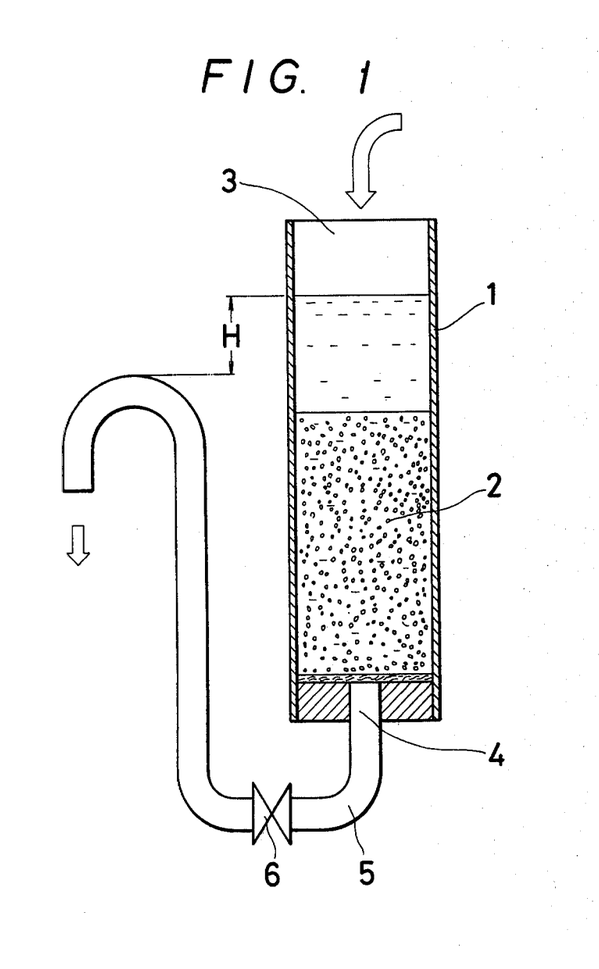
FIG. 1 is a sectional view of an embodiment of adsorption equipment suitable for use in the practice of the invention.

FIG. 1 shows an arrangement of this embodiment. In a transparent cylinder 1, 2 is a silica gel bed. Sewage flows into an inlet opening 3 of the cylinder 1. Sewage passes through the silica gel bed 2, an outlet 4, a pipe 5 and a valve 6 in succession.

In this example the pressure loss due to passage of the sewage through the silica gel bed can arbitrarily be determined by the size of gap H between the top of the pipe 5 and the water level illustrated.

Data on the residual concentrations of ammonia nitrogen with regard to the time of Passage of sewage is shown in Table 1.

TABLE 1

| time of Passage (min) | volume of effluent (ml) | residual concentration of ammonia nitrogen (ppm) | reduction ratio R |
|---|---|---|---|
| 6 | 200 | 2.0 | 0.10 |
| 20 | 600 | 2.9 | 0.16 |
| 37 | 1100 | 5.1 | 0.26 |
| 53 | 1600 | 7.2 | 0.37 |

Here the reduction ratio of ammonia nitrogen is defined by $$\text{(reduction ratio)} = \frac{\text{(concentration at outlet)}}{\text{(concentration at inlet)}}$$

As the time of Passage elapses, the reduction ratio R of ammonia nitrogen is gradually increasing, because the silica gel is saturated with adsorbed ammonia.

Figure 2:
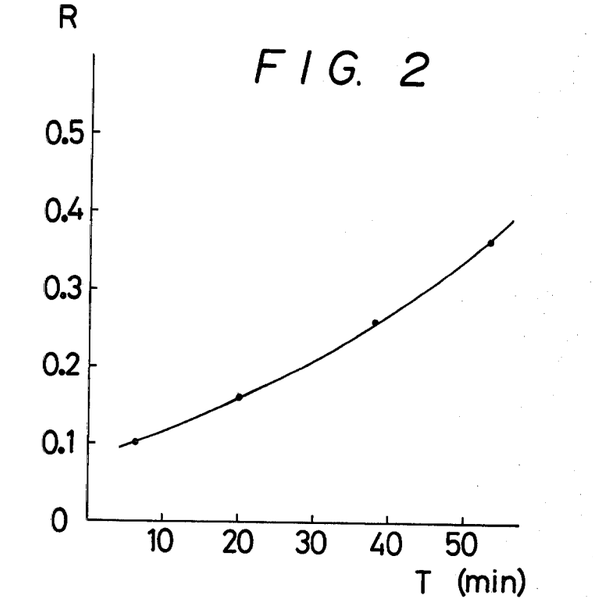
FIG. 2 is a graph which shows the relation between the time of passage of sewage and the reduction ratio of outlet ammonia nitrogen to inlet ammonia nitrogen.

FIG. 2 shows a graph of the reduction ratio R against the time of Passage of sewage. This is a result of measuring the dynamic adsorption ability of silica gel.

EMBODIMENT (2) (Static example)

a. Silica gel:
globular form
diameter about 3 mm
amount used 20~80 g b. Test Sewage Test Sewage was made from city water by adding ammonium chloride (NH4Cl) until the concentration of ammoniated nitrogen came up to 27.0 ppm. Then the pH of the Sewage was adjusted to 11.4 by adding caustic soda. The temperature of the test sewage was 20° C. and the volume of sewage used was 150 ml.

c. Contact time was 6 hours.

Each flask was allowed to stand while being stirred for 6 hours in order that the adsorption of ammonia was fully saturated.

Table 2 shows a result of measuring the residual concentration of ammonia nitrogen against various amounts of silica gel.

TABLE 2

| silica gel (g) | residual concentration of ammonia nitrogen in the effluent (ppm) |
|---|---|
| 20 | 10.0 |
| 40 | 5.0 |
| 60 | 3.1 |
| 80 | 2.7 |

As the amount of silica gel increases, the residual concentration of ammonia nitrogen sewage decreases. This result is represented by Freundlich's equation:

$$q = KC^{1/n}$$

where q is the specific adsorption ability (mg/mg); C is the residual concentration of ammonium nitrogen in an equilibrium state; and, K and n are constants, which exhibit a characteristic of the adsorption phenomenon. Specific adsorption ability is defined as the weight of ammonia nitrogen adsorbed per unit weight of silica gel.

Figure 3:
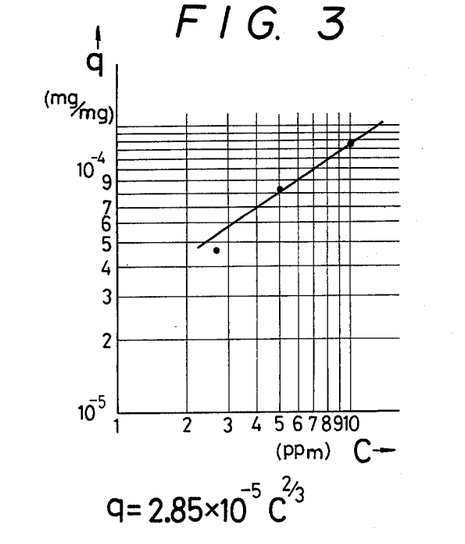
FIG. 3 is an isothermal adsorption curve showing the relation between residual concentration (C) of ammonia nitrogen in an equilibrium state and the amount of adsorbates (mg/mg). (To correspond to Freundlich's equation).

FIG. 3 shows an isothermal adsorption curve where the abscissa and the ordinate denote the residual concentration C of ammonia nitrogen in an equilibrium state; and, the specific adsorption ability q respectively. From FIG. 3 the constants K and n are determined as follows.

$K = 2.85 \times 10^{-3}$ $1/n = \frac{2}{3}$

Similar experiments have been done with an activated alumina and an activated carbon for comparison. The activated alumina used in the experiment had a spherical form with a diameter of 3 mm~5 mm. The amount used was 20 g~60 g.

The activated carbon used had an amorphous form with a diameter of 1 mm~3 mm. The amount used was 20 g~60 g.

The concentration of ammonia nitrogen in the test sewage was adjusted to 24 ppm. The pH was 11, the temperature of the sewage was 18° C. and the amount of the sample was 150 ml. The contact time for adsorption was six hours like usual adsorption experments, because it was assumed to be long enough to saturate any adsorption phenomena in a closed vessel.

The results of the static experiments are shown in Table 3 with regard to the activated alumina and the activated carbon.

TABLE 3

| Amount Used (g) | residual concentration of ammonia nitrogen | |
|---|---|---|
| | activated alumina (ppm) | activated carbon (ppm) |
| 20 | 13.6 | 11.2 |
| 40 | 9.1 | 9.1 |
| 60 | 7.1 | 7.7 |

Figure 4:
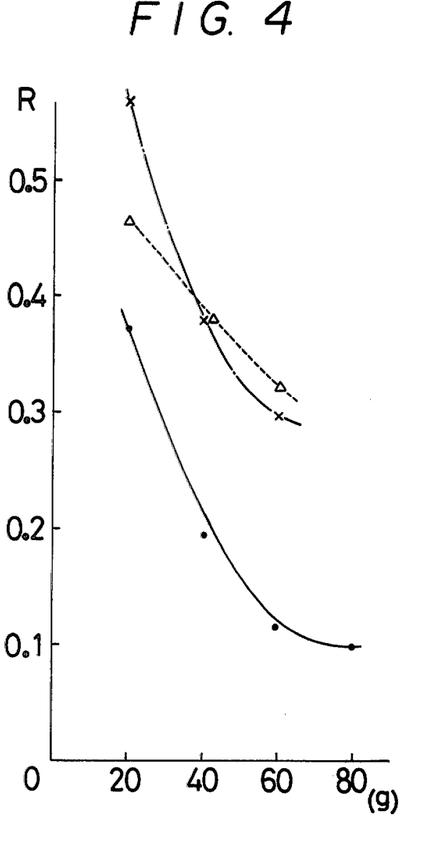
FIG. 4 is a graph showing the relation between the amounts of various adsorbents-silica gel, activated almina and activated carbon—, and the reduction ratios of ammonia nitrogen, where •, ∆ and × denote silica gel, activated carbon and activated alumina, respectively.

FIG. 4 is a graph showing the reduction ratio (final concentration/initial concentration) of ammonia nitrogen to the amount of adsorbent where the materials are indicated as silica gel (●), activated alumina (×) and activated carbon (Δ).

Comparing these data, it can be seen that silica gel is the best adsorbent for ammonia nitrogen in sewage. The adsorption ability of silica gel is nearly twice as great as that of the activated carbon or activated almina.

EMBODIMENT (3)

The difference of the adsorption ability between the original silica gel and the alkali-conditioned silica gel was also investigated.

| a. | silica gel: | globular form | |
|---|---|---|---|
| | | diameter | 3 mm |
| | | amount used | 20 g~60 g |
| | { o | alkali conditioned | |
| | { e | original | | b. test sewage

Test sewage was made of city water by adding ammonium chloride (NH₄Cl) till the concentration of ammonia nitrogen came up to 15.2 ppm. The temperature of the sewage was 22° C. The sample was 150 ml. Preliminarily the pH of the test sewage was adjusted to 11.0 by adding caustic soda. The contact time was 6 hours under the static condition like the preceding example.

The data on the two different kinds of silica gel,—alkali-conditioned and original,—are shown in Table 4.

TABLE 4

| amount used (g) | residual concentration of ammonia nitrogen in the effluent | |
|---|---|---|
| | alkali-conditioned silica gel (ppm) | original silica gel (ppm) |
| 20 | 5.7 | 7.1 |
| 40 | 3.8 | 6.0 |
| 60 | 2.2 | 8.2 |

Although original silica gel adsorbs ammonia nitrogen in the sewage well, alkali-conditioned silica gel can adsorb ammonia nitrogen more completely. Therefore it is better to condition silica gel with alkali solution preliminarily. Moreover if the amount of original silica gel increases beyond a certain point, the residual concentration of ammonia nitrogen increases to the contrary. Perhaps an excess of original silica gel may lower the pH of the sewage and decrease the adsorption ability of itself.

Figure 5:
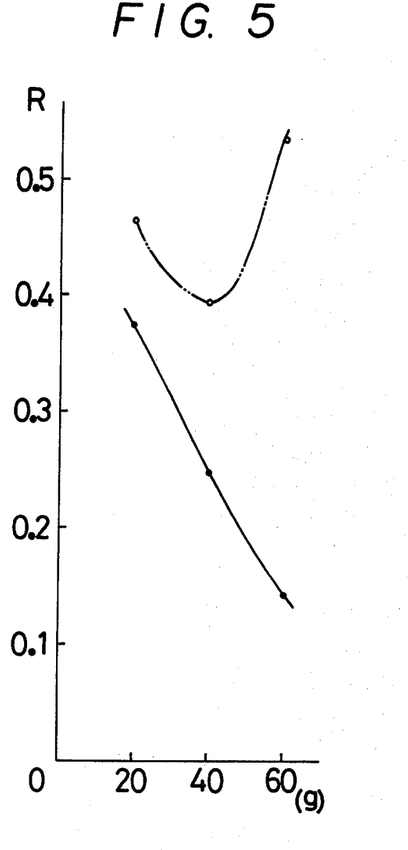
FIG. 5 is a graph showing the relation between the amount of adsorbents and the reduction ratio of ammonia nitrogen, where • and · denote the silica gel conditioned by alkali and the original silica gel respectively.

FIG. 5 shows the graph of the reduction ratio of ammonia nitrogen as ordinate to the amount of silica gel as abscissa. "●" denotes alkali-conditioned silica gel and "○" denotes original silica gel.

This invention is totally novel, because this technique utilizes silica gel to adsorb ammonia nitrogen in sewage. Silica gel turns out to be a very powerful adsorbent superior to activated almina or activated carbon. It is another advantage that silica gel saturated with ammonia can easily be completely regenerated. In this respect, unlike zeolite, silica gel does not deteriorate by the repetition of the regeneration process: silica gel is cheap in that its cost is only one third that of zeolite.

Furthermore silica gel is insoluble in water, and very stable chemically. Moreover silica gel has no taste, no odors and no toxicity; it does not cause any secondary pollution. Also, the silica gel method is much safer than the breakpoint chlorination method aforementioned.

Still further, this method requires only a small installation because it can fully eliminate ammonia by passing sewage through the silica gel bed; and, as noted, silica gel is cheap, so that operating costs are comparatively low.

It is very difficult to fully understood why the silica gel adsorbs ammonia nitrogen from sewage. Even the inventor cannot fully understand the adsorption mechanism of the silica gel.

It is well known that silica gel can adsorb some gas impurities besides moisture that is in the air. In any conventional case, however, silica gel is used in air. Probably, no one has tried to use silica gel in water treatment, because, in water, silica gel would lose the adsorption ability for moisture in a short time.

On the contrary activated carbon is a well-known typical adsorbent which is frequently used in water treatement. Unlike silica gel, however, activated carbon hardly adsorbes water because it is a nonpolar adsorbent. Activated carbon selectively adsorbs nonpolar materials, for example hydrocarbons. Even if activated carbon already contains moisture, in the presence of hydrocarbons, it will adsorb hydrocarbons selectively.

Activated carbon does not adsorb polar materials very well. Hence, since ammonia is a polar material, it is not fully adsorbed by activated carbon.

When silica gel is dipped in water, the surfaces of the narrow holes in the silica gel adsorb water molecules. From these experiments the inventor thinks that even if the surfaces of the narrow holes in the silica gel are saturated with water molecules, the ammonia molecules can repulse the water molecules on the surface of silica gel and then be adsorbed on the vacant surface. It is not known whether ammonia molecules or water molecules are more easily adsorbed by silica gel. Perhaps it may be an unprecedented problem. The inventor knows neither report nor thesis discussing such a problem.

The following are only hypotheses contrived by the inventor.

Ammonia molecules resemble water molecules in some aspects.

The molecular weight of water and ammonia are 17 and 18 respectively. The difference is trivial. The dipole moments of water and ammonia are $1.85 \times 10^{-13}$ e.s.u and $1.47 \times 10^{-13}$ e.s.u. respectively. Water has a stronger dipole moment than ammonia.

The oxygen in the water molecule has two loan pairs, which are defined as an electron pair owned by a single atom. The nitrogen in the ammonia molecule has one loan pair.

The structural formula of water is

The structural formula of ammonia is

Water is apt to build a hybrid orbital at the loan pair which attracts a hydrogen atom of an other water molecule. The bond structure of two molecules by the action of the hybrid orbital is called a hydrogen bond.

Repeated formations of hydrogen bonds associate many water molecules and convert water to ice when cooled to 0° C.

Like water molecules, ammonia molecules associate together by the action of hydrogen bonds. A hydrogen atom is attracted by a loan pair of a nitrogen atoms of another ammonia molecule. The loan pair forms a hydrogen bond which connects the two ammonia molecules.

The strengths of the hydrogen bonds of water and ammonia are probably estimated by their melting points, because at the melting point the thermal energy of a molecule would be equal to the bond energy of the hydrogen bond.

melting point of water 273° K.
melting point of ammonia 195° K.

The ratio is nearly 7:5. Ammonia may have hydrogen bonds that are slightly weaker than water.

Two mechanisms are known for the manner in which silica gel adsorbs water molecules. One such mechanism is a capillary phenomenon. The adsorption mechanism of the aforementioned B-type silica gel is attributed to this phenomenon.

Another adsorption mechanism is derived from OH groups on the surface of the narrow holes in the silica gel. Water molecules are captured by the affinity of the hydroxyl groups on the surface of the silica gel.

The A-type silica gel has a wider surface than the B-type and more hydroxyl groups on the surface. In the A-type silica gel the hydrogen atom of the hydroxyl group builds up a hydrogen bond with the oxygen atom of a water molecule. Therefore the A-type silica gel is appropriate to completely adsorb water vapor at a low humidity.

The inventor supposes that the hydroxyl groups covering the surface of the silica gel would form hydrogen bonds with nitrogen atoms of ammonia molecules, because hydrogen bonds are built up by either oxygen or nitrogen with hydrogen.

The adsorption mechanism, written as:

is realized by the A-type silica gel in water. Thus the similar adsorption mechanism, written as:

must be realized by the silica gel in water. In this case the loan pair of nitrogen of ammonia must form a hybrid orbital connecting the nitrogen atom with a hydrogen atom of the hydroxyl groups on the surface of the silica gel.

As above mentioned, ammonia and water have closely similar molecular weights, electric dipole moments, freezing points and tendencies for the formation of hydrogen bonds. For the same reasons, therefore, ammonia must build up a hydrogen bond with the hydroxyl groups and be adsorbed by silica gel.

The adsorption dynamics will now be analyzed in detail referring to the experimental data. The notations are defined as follows:

S: Total number of adsorption sites of silica gel (1/l)
W: Number of water molecules adsorbed by silica gel (1/l)
N: Number of ammonia molecules adsorbed by silica gel (ppm)
No: Total number of ammonia molecules
N: Number of free ammonia molecules The number of vacant sites of silica gel is $(s - w - n)$.

The increasing rate of adsorbed water molecules is proportionate to the number of the vacant sites and the decreasing rate is proportionate to the number of adsorbed water molecules. Thus the differential coefficient of the number of adsorbed water molecules is given by $$\dot{w} = k(s - w - n) - \alpha w \qquad (1)$$

where k is a probability that a vacant site adsorbes a water molecule in a unit time and $\alpha$ is a probability that a water molecule captured at a site desorbs from the site in a unit time.

Similarly the differential coefficient of the number of adsorbed ammonia molecules is written as:

$$\dot{n} = Nh(s - w - n) - \beta n \qquad (2)$$

where h is an adsorption probability of ammonia in a unit time and $\beta$ is a probability that an ammonia molecule captured at a site desorbs from the site site in a unit time.

An initial condition that
at $t = 0$, $n = 0$ and $k(s - w) - \alpha w = 0$
is imposed to investigate the dynamics in the adsorption bed of silica gel which is saturated with water at first.

At the beginning of the operation Eq. (2) is approximately rewritten as:

$$\dot{n} \cong Nh\alpha w/k$$

From the equation that number of the ammonia molecules adsorbed in the sites turns out to increase from n=o linearly at first. On the contrary Eq. (1) shows that the number (w) of adsorbed water molecules would decrease secondarily as n is rising.

Ammonia gradually replaces water on the adsorption sites of silica gel. However, all of the ammonia molecules are not adsorbed, the adsorption of ammonia stops at an equilibrium.

In an equilibrium state, Eq. (1) and Eq. (2) are equal to zero. Then an equlibrium equation $$n(\eta/No - n + \gamma) = \gamma S \quad (3) \text{ PS}$$

is obtained, where:

$$\eta/\gamma = \beta(1 + k/\alpha)/h.$$

As $\gamma S$ is a constant proportionate to the number of adsorption sites of silica gel, $\gamma S$ is safely defined to be the amount of silica gel used. Practically it is convenient to equate $\gamma S$ to the weight of silica gel used in the experiment.

Embodiment (2) (which is a static example shown in Table 2, FIG. 3, or FIG. 4) will now be further considered.

From the data, when $\gamma S$ (weight of silica gel) is 20, 40, 60, or 80, the residual concentration of ammonia nitrogen (NO−n) is 10.0, 5.0, 3.1 or 2.7 ppm respectively. Total ammonia nitrogen concentration No is 24 ppm.

In the equilibrium equation (3), if the constants $\delta$ and $\eta$ take the values $$\gamma = 6.7$$

$$\eta = 0.75,$$

all four data points can be explained without contradiction. According to the substitutions, the trial equlibrium equation is written as, PS $$n(6.7/No - n + 0.75) = \Sigma \quad (4)$$

where $\Sigma$ is the weight of silica gel used. In practice the correspondences between the lefthand side and the righthand side of Eq. (4) are, (No=24)

|        |        | lefthand          | righthand       |
|--------|--------|-------------------|-----------------|
| No − n | = 10.0 | $\Sigma$ = 19.9   | $\Sigma$ = 20   |
|        | = 5.0  | $\Sigma$ = 39.7   | $\Sigma$ = 40   |
|        | = 3.1  | $\Sigma$ = 60.8   | $\Sigma$ = 60   |
|        | = 2.7  | $\Sigma$ = 70     | $\Sigma$ = 80   |

The calculation based on Eq. (4) coincides well with the experimental result. Although a disagreement occurs at the final case where $\Sigma = 80$ and No−n=2.7, it may be caused by a measuring error. As visually shown in FIG. 3 this case corresponds to the leftmost point (C=2.7, q=3.6×10−5), which also differs from Freundlich's equation (represented by the direct line).

According to the trial equation, the constant is given by $$\beta(1 + k/\alpha)/h = 8.93 \quad (5)$$

Unknown constants $\beta$, k, $\alpha$ and h cannot be determined by Eq. (5). Another dynamic experiment will be useful to definitely determine the constants.

But Eq. (5) gives important information about the tendency for the adsorption of water and ammonia by silica gel.

As No h is an adsorption probability of ammonia molecules and $\beta$ is a separating probability of water molecules, the ratio of the adsorption probability divided by the desorption probability is given by:

$$No \, h/\beta$$

which denotes the tendency for the adsorption of ammonia molecules.

Similarly the tendency for the adsorption of water molecule is estimated by:

$$k/(k + \alpha)$$

Then the ratio (H) of the adsorption tendency of water to ammonia is written as:

$$H = \frac{\beta}{\left(1 + \frac{\alpha}{k}\right) No\, h} \quad (6)$$

The ratio H cannot be exactly calculated, but, as No=24 in this case, if Eq. (5) is divided by No, the quotient is given by:

$$\beta(1 + k/\alpha)/NO \, h = 0.372$$

As $\alpha$ and k are positive, the inequality $$1 + \frac{k}{\alpha} > \frac{1}{1 + \frac{\alpha}{k}}$$

is realized. Then the ratio H of the adsorption tendency of water to ammonia is restricted as $$H < 0.372$$

in this case.

This means that ammonia molecules are adsorbed more powerfully than water molecules or that ammonia molecules are separated less frequently than water molecules. Therefore, silica gel may be very useful in adsorbing ammonia nitrogen in sewage.

What I claim is:

1. A method for eliminating ammonia nitrogen from sewage comprising the steps of:
    adding alkali to sewage to convert ammonium ions to dissolved ammonia; and,
    contacting the alkali-treated sewage with alkali-conditioned silica gel to adsorb said dissolved ammonia onto said alkali-conditioned silica gel.

2. A method for eliminating ammonia nitrogen from sewage as claimed in claim 1 wherein:
    said alkali is added to said sewage until the pH of the sewage rises over 10.

3. A method for eliminating ammonia nitrogen from sewage as claimed in claim 1 wherein:
    said silica gel is packed into an adsorption vessel; and,
    the alkali-treated sewage passes through the silica gel in said adsorption vessel continually.

4. A method for eliminating ammonia nitrogen from sewage as claimed in claim 3 wherein:
the alkali-treated sewage is passed through said silica gel in said adsorption vessel at a linear velocity of between about one meter per hour and two meters per hour.

5. A method for eliminating ammonia nitrogen from sewage as claimed in claim 1 wherein:
said silica gel is packed into an adsorption vessel;
the alkali-treated sewage is passed through said silica gel in said vessel; and,
said vessel is drained at predetermined intervals.

6. A method for eliminating ammonia nitrogen from sewage as claimed in claim 4 wherein:
the retention time of the alkali-treated sewage in the adsorption vessel is more than 4 hours.

* * * * *